United States Patent
Park et al.

(10) Patent No.: US 11,891,515 B2
(45) Date of Patent: Feb. 6, 2024

(54) MODIFIED POLYISOBUTYLENE POLYMER FOR RUBBER COMPOUNDING AND RUBBER COMPOSITION INCLUDING SAME

(71) Applicant: DL Chemical CO., LTD., Seoul (KR)

(72) Inventors: Min Sup Park, Daejeon (KR); Se Hyun Lee, Daejeon (KR); Seung Bin Ryu, Daejeon (KR); Myeong Seok Kim, Sejong-si (KR)

(73) Assignee: DL Chemical CO., LTD., Seoul (KR)

( * ) Notice: Subject to any disclaimer, the term of this patent is extended or adjusted under 35 U.S.C. 154(b) by 83 days.

(21) Appl. No.: 17/476,957

(22) Filed: Sep. 16, 2021

(65) Prior Publication Data

US 2022/0081540 A1    Mar. 17, 2022

(30) Foreign Application Priority Data

Sep. 17, 2020    (KR) .................. 10-2020-0119692

(51) Int. Cl.
*C08L 9/06*    (2006.01)
*C08F 10/10*    (2006.01)

(52) U.S. Cl.
CPC ............... *C08L 9/06* (2013.01); *C08F 10/10* (2013.01); *C08F 2810/00* (2013.01); *C08L 2205/03* (2013.01)

(58) Field of Classification Search
CPC .... C08L 9/06; C08L 2205/03; C08F 2810/00; C08F 10/10
See application file for complete search history.

(56) References Cited

U.S. PATENT DOCUMENTS

| | | | | |
|---|---|---|---|---|
| 6,372,855 B1 * | 4/2002 | Chino | ............... | C08L 33/26 525/327.4 |
| 8,637,606 B2 | 1/2014 | Pille-Wolf et al. | | |

FOREIGN PATENT DOCUMENTS

| | | |
|---|---|---|
| CN | 1275143 A | 11/2000 |
| CN | 1723221 A | 1/2006 |
| CN | 101184801 A | 5/2008 |
| CN | 101861338 A | 10/2010 |
| CN | 101945904 A | 1/2011 |
| CN | 102432757 A | 5/2012 |
| CN | 103189401 A | 7/2013 |
| CN | 103492471 A | 1/2014 |
| CN | 103649203 A | 3/2014 |
| CN | 104822367 A | 8/2015 |
| CN | 109890934 A | 6/2019 |
| CN | 111278905 A | 6/2020 |
| JP | 2000-169523 A | 6/2000 |
| JP | 2016-166309 A | 9/2016 |
| KR | 10-0275977 B1 | 12/2000 |
| KR | 10-0569053 B1 | 4/2006 |
| KR | 10-0871990 B1 | 12/2008 |
| KR | 10-2011-0072253 A | 6/2011 |
| KR | 10-2015-0024701 A | 3/2015 |
| KR | 10-2016-002044 A | 1/2016 |
| KR | 10-1591276 B1 | 2/2016 |
| KR | 10-2017-0121694 A | 11/2017 |

OTHER PUBLICATIONS

Office Action dated Jun. 13, 2022 in Korean Application No. 10-2020-0119692.
Office Action dated Apr. 4, 2022 in Indian Application No. 202124041189.
Extended European Search Report dated Feb. 17, 2022 in European Application No. 21196833.4.
Yu Jianying et al., "A Study of Interface Reaction between Amino Silane and Maleic Anhydride Grafted Polypropylene", Chinese Journal of Chemical Physics, 2000, vol. 13, No. 1, pp. 109-112 (4 pages).
Translation of Communication dated Sep. 22, 2023, issued in Chinese Application No. 202111088144.3.

* cited by examiner

*Primary Examiner* — Robert D Harlan
(74) *Attorney, Agent, or Firm* — Sughrue Mion, PLLC (57) ABSTRACT

Disclosed is a modified polyisobutylene polymer for rubber compounding. The modified polyisobutylene polymer is prepared by reacting reactants including a polyisobutylene in which the main chain is isobutylene, an unsaturated dicarboxylic anhydride, and an amino group-containing silane compound. The modified polyisobutylene polymer includes a diamide structure. When the modified polyisobutylene polymer is used as an additive for rubber compounding, the processability of the rubber is increased, the dispersibility of fillers is significantly improved, and the effect of obtaining excellent grip performance and improved rolling resistance can be achieved.

9 Claims, 1 Drawing Sheet

MODIFIED POLYISOBUTYLENE POLYMER FOR RUBBER COMPOUNDING AND RUBBER COMPOSITION INCLUDING SAME

CROSS REFERENCE TO RELATED APPLICATION

The present application claims priority to Korean Patent Application No. 10-2020-0119692, filed Sep. 17, 2020, the entire contents of which is incorporated herein for all purposes by this reference.

BACKGROUND OF THE INVENTION

1. Field of the Invention

The present invention relates to a modified polyisobutylene polymer for rubber compounding and a rubber composition including the same.

2. Description of the Related Art

Polyisobutylene is a polymer having a number average molecular weight (Mn) of about 300 to 10,000 and is obtained by polymerizing an olefin component having 4 carbon atoms (C4) obtained in a naphtha-cracking process using a Friedel-Craft-type catalyst.

What remains after extracting 1,3-butadiene from C4 feedstock is called C4 raffinate-1 which includes paraffins such as isobutane, normal butane, etc., and olefins such as 1-butene, 2-butene, isobutene, etc. Here, the content of isobutene in the C4 raffinate-1 is about 30% to 50% by weight. The C4 raffinate-1 is mainly used for the preparation of methyl t-butylether (MTBE) or polyisobutylene, serving as an octane number improver. Since the reactivity of isobutene is the highest among the olefin components of C4 raffinate-1, the resulting polyisobutylene is mainly composed of isobutene units. Polyisobutylene increases in viscosity with increased molecular weight thereof and has a viscosity of about 4 to 40000 cSt (centi-stokes) at 100° C.

Korean Patent Application Publication No. 10-2011-0072253 discloses a method of improving the grip performance of a tire tread using polyisobutylene having high reactivity. Korean Patent Application Publication No. 10-2007-0096748 discloses a method of improving wear resistance, fuel efficiency, and braking performance using carboxylated liquid isoprene rubber. As such, efforts are being made to increase fuel efficiency and braking performance of rubber, specifically when applied to tire treads.

Regarding improvement of grip force, Korean Patent Application Publication No. 10-2016-0002044 discloses a composition exhibiting good grip performance and wear resistance under high-speed conditions due to the use of a master batch in which pellet-type plant resins such as sesame resin, sunflower resin, coconut resin and the like are added to styrene butadiene rubber. The grip force is a technique in which the surface of a tire is brought into close contact with the road surface, and it is advantageous for the tire to have as good elasticity as possible to increase the grip force. However, when considering both grip force and rolling resistance, rolling resistance advantageously decreases with a decrease in closeness of contact with the road surface, so there is a tradeoff between rolling resistance and the grip force of the tire. Specifically, a tire having low rolling resistance is advantageous in terms of fuel efficiency but may have poor contact with a road when the road is wet. Accordingly, recent tire development is progressing in a way to control both at the same time, rather than a one-dimensional approach of increasing either the rolling resistance or the grip force.

For example, Korean Patent Application Publication No. 10-2015-0024701 and U.S. Pat. No. 8,637,606 disclose the use of silica and a modified terpene phenol resin having a high softening point, in which the phenol increases compatibility with synthetic rubber to thus reduce the fluidity of the resin, thereby improving grip performance on wet surfaces without deteriorating rolling resistance. Korean Patent No. 10-1591276 discloses a rubber composition including 20 to 50 parts by weight of epoxidized natural rubber having a glass transition temperature (Tg) of −50° C. to −40° C., a Mooney viscosity of 60 to 80, and an epoxidation degree of 5% to 50%, thereby improving the braking power of tires on wet road surfaces, and uniformly improving low rolling resistance or fuel efficiency and durability without deteriorating wear resistance. Despite a variety of such attempts, there is still a need for a technique that can give satisfactory numerical values for both rolling resistance and grip force of tires.

CITATION LIST

Patent Literature (Patent Literature 1) Korean Patent Publication No. 10-2011-0072253
(Patent Literature 2) Korean Patent Publication No. 10-2007-0096748
(Patent Literature 3) Korean Patent Publication No. 10-2016-0002044
(Patent Literature 4) Korean Patent Publication No. 10-2015-0024701
(Patent Literature 5) U.S. Pat. No. 8,637,606
(Patent Literature 6) Korean Patent No. 10-1591276

SUMMARY OF THE INVENTION

An objective of the present invention is to provide a modified polyisobutylene polymer for rubber compounding, which enables the preparation of a rubber composition capable of exhibiting improved processability, grip performance, and rolling resistance as well as high dispersibility of a filler when mixed with the filler.

A first aspect of the present invention relates to a modified polyisobutylene polymer for rubber compounding. The modified polyisobutylene polymer being prepared by reacting polyisobutylene in which the main chain is isobutylene, unsaturated dicarboxylic acid anhydride, and an amino group-containing silane compound. The modified polyisobutylene polymer features that it includes a diamide structure.

In the first aspect, the modified polyisobutylene polymer in the form of diamide for rubber compounding is prepared by reacting: a derivative prepared by reacting polyisobutylene with an unsaturated dicarboxylic acid anhydride; and an amino group-containing silane compound.

In the first aspect, the molar ratio of the polyisobutylene to the unsaturated dicarboxylic acid anhydride may be 1:0.7 to 2, and the molar ratio of the derivative to the amino group-containing silane compound may be 1:2 to 5.

In the first aspect, the polyisobutylene may have a number average molecular weight in a range of from 200 to 10,000 g/mol, and a molecular weight distribution in a range of from 1 to 5.

In the first aspect, the unsaturated dicarboxylic anhydride may be at least one selected from among maleic anhydride, itaconic anhydride, citraconic anhydride, propenyl succinic anhydride, and 2-pentendioic anhydride.

In the first aspect, the amino group-containing silane compound may satisfy Formula 1 shown below.

[Formula 1]

(In Formula 1,

$R_1$ and $R_2$ are each independently selected from among (C1-C5)alkylene, (C1-C5)aminoalkylene, carbonylene, and (C1-C5)alkylcarbonylene;

$R_3$, $R_4$, and $R_5$ are each independently selected from among hydrogen, hydroxy, (C1-C20)alkyl, (C1-C12)cycloalkyl, (C2-C14)acyloxy, (C4-C20)aryloxy, (C5-C30)araloxy, (C1-C20)amine, and (C1-C12)alkoxy;

A is methylene, $S_n$, or $((R_6)NR_7)_n$ wherein $R_6$ is hydrogen or (C1-C5) alkyl, $R_7$ is (C1-C5)alkylene, and n is an integer in a range of from 1 to 10.)

In the first aspect, the amino group-containing silane compound may be one compound, or two or more compounds selected from the group consisting of 3-aminopropyl trimethoxy silane, 3-aminopropyl triethoxysilane, 3-aminopropyl methyldimethoxysilane, 3-aminopropyl methyldiethoxysilane, 3-(2-aminoethylamino)propyl trimethoxysilane, 3-(2-aminoethylamino)propyl triethoxysilane, N-(2-aminoethyl)-3-aminopropyl trimethoxysilane, N-(2-aminoethyl)-3-aminopropyl triethoxysilane, 3-aminopropyl silanetriol, (3-(2-aminoethylamino)propyl methyldimethoxysilane), 2-ethanediamine N-(2-aminoethyl)-N'-[3-(trimethoxysilyl)propyl]-1, 1-[3-(trimethoxysilyl)propyl] urea, and 1-[3-(triethoxysilyl)propyl)]urea.

In the first aspect, the modified polyisobutylene polymer for rubber compounding may include an end group having a diamide structure satisfying Formula 2 shown below.

[Formula 2]

(In Formula 2, $L_1$ and $L_2$ are each independently a linear or branched (C1-C5)alkylene;

$R_1$ and $R_2$ are each independently selected from among (C1-C5)alkylene, (C1-C5)aminoalkylene, carbonylene, and (C1-C5)alkylcarbonylene;

$R_3$, $R_4$, and $R_5$ are each independently selected from among hydrogen, hydroxy, (C1-C20)alkyl, (C1-C12)cycloalkyl, (C2-C14)acyloxy, (C4-C20)aryloxy, (C5-C30)araloxy, (C1-C20)amine, and (C1-C12)alkoxy;

A is methylene, $S_n$, or $((R_6)NR_7)_n$ wherein $R_6$ is hydrogen or (C1-C5) alkyl, $R_7$ is (C1-C5)alkylene, and n is an integer in a range of from 1 to 10;

* indicates a connection with polyisobutylene.)

In the first aspect, the modified polyisobutylene polymer for rubber compounding may have a Si content of 0.03 mass % to 10 mass % when measured by X-ray fluorescence analysis.

In the first aspect, the modified polyisobutylene polymer for rubber compounding may have a viscosity in a range of from 1 to 15000 cP at 150° C.

In the first aspect, the modified polyisobutylene polymer for rubber compounding may have a number average molecular weight in a range of from 800 to 10,000 g/mol and a molecular weight distribution in a range of from 1 to 5.

In addition, a second aspect of the present invention relates to a rubber composition including the modified polyisobutylene polymer for rubber compounding described above; a rubber base; and a filler.

In the second aspect, the filler may be silica, carbon black, or a mixture thereof.

In the second aspect, the rubber base include at least one selected from among butadiene rubber, butyl rubber, emulsion polymerization styrene butadiene rubber (E-SBR), solution polymerization styrene butadiene rubber (S-SBR), epichlorohydrin rubber, nitrile rubber, hydrogenated nitrile rubber, brominated polyisobutylisoprene-co-paramethyl styrene (BIMS) rubber, urethane rubber, fluororubber, silicone rubber, styrene-ethylenebutadiene styrene copolymer rubber, ethylenepropylene rubber, ethylenepropylenediene monomer rubber, hypalon rubber, chloroprene rubber, ethylene vinyl acetate rubber, and acrylic rubber.

In the second aspect, the rubber composition may include 50 to 150 parts by weight of silica, 5 to 20 parts by weight of carbon black, and 2 to 40 parts by weight of a modified polyisobutylene polymer for rubber compounding, relative to 100 parts by weight of the rubber base.

The modified polyisobutylene polymer for rubber compounding, according to the present invention, is characterized in that it is prepared by reacting an amino group-containing silane compound with a derivative that is prepared by reacting polyisobutylene with an unsaturated dicarboxylic anhydride. When the modified polyisobutylene polymer is included in a rubber composition, the modified polyisobutylene polymer improves the processability of the rubber composition and greatly improves the dispersibility of filler is remarkably improved, and high gripping performance and low rolling resistance are exhibited.

The modified polyisobutylene polymer for rubber compounding, according to the present invention, includes a diamide structure including two amide groups. At an end of each amino group at which a silane element is present, a coupling agent, end-modified rubber, or silica filler reacts so that the dispersibility of the silica filler is improved and the physical properties of a rubber compound are improved.

DESCRIPTION OF THE PREFERRED EMBODIMENTS

The advantages and features of embodiments of the present invention and methods of achieving the same will be clarified with reference to examples described below in detail. However, the present invention is not limited to these embodiments, but may be modified in other forms. These embodiments are provided in order to fully convey the spirit of the present invention to those skilled in the art so that the contents introduced herein are thorough and complete, but the present invention is only defined by the scope of the claims. Like numbers refer to like elements throughout the following description herein.

Further, in describing embodiments of the present invention, well-known functions or constructions will not be described in detail since they may unnecessarily obscure the gist of the present invention. The following terms are defined in consideration of the functions in the examples of the present invention and thus may vary depending on the intentions of users, operators, or the like. Therefore, the definition of each term should be interpreted based on the contents throughout this specification.

A first aspect of the present invention relates to a modified polyisobutylene polymer for rubber compounding, the modified polyisobutylene polymer being prepared by reacting polyisobutylene in which the main chain is isobutylene, unsaturated dicarboxylic anhydride, and an amino group-containing silane compound, in which the modified polyisobutylene polymer includes a diamide structure.

When the modified polyisobutylene polymer for rubber compounding is included in a rubber composition, the processability of the rubber composition is improved, the dispersibility of fillers is remarkably improved, and rubber prepared from the rubber composition exhibits high grip performance and low rolling resistance.

The modified polyisobutylene polymer for rubber compounding, according to the present invention, includes a diamide structure including two amide groups. At an end of each amino group at which a silane element is present, a coupling agent, end-modified rubber, or a silica filler reacts so that the dispersibility of the silica filler is improved and the physical properties of a rubber compound are improved.

More specifically, a result of X-ray fluorescence analysis shows that the modified polyisobutylene polymer for rubber compounding, according to an embodiment of the present invention, has a Si content of 0.03% to 10% by mass, more preferably 0.05% to 5% by mass, and most preferably 0.05% to 3%. When the Si content falls within the above-mentioned range, the processability of a rubber composition and the dispersibility of a filler are improved, upon subsequent mixing with the rubber base and the filler to prepare the rubber composition.

In addition, the modified polyisobutylene for rubber compounding, according to one example of the present invention, may have a viscosity of 1 to 15,000 cP measured by a Brookfield viscometer at 150° C., and preferably a viscosity of 5 to 10,000 cP. When the viscosity falls within the above-mentioned range, a storage modulus difference (ΔG') value due to the Payne effect may be as low as 2.5 or less and preferably 2.0 or less, upon subsequent mixing with the rubber base and the filler, indicating that the filler is uniformly dispersed. In this case, the ΔG' means a difference $G'_{20\%}$-$G'_{0.02\%}$ between a storage modulus $G'_{20\%}$ measured at an elongate of 20% and a storage modulus $G'_{0.02\%}$ measured at an elongation of 0.02%.

In addition, the modified polyisobutylene polymer according for rubber compounding, according to one example of the present invention, may have a number average molecular weight in a range of from 800 to 10,000 g/mol and a molecular weight distribution in a range of from 1 to 5. When the molecular weight distribution is greater than 5, there is a problem in that the physical properties of rubber compositions containing the modified polyisobutylene polymer largely vary. On the other hand, when the number average molecular weight is less than 800 g/mold, the production productivity of rubber is lowered because light polymers are generated in a large amount. Conversely, when the number average molecular weight exceeds 10,000 g/mol, there is a problem in that the production of rubber is not easy because a rubber production plant is overloaded due to the increased viscosity. When those ranges are satisfied, rubber having a dynamic loss coefficient of 0.64 or greater at 0° C. and a dynamic loss coefficient of 0.112 or less at 60° C. will be produced when being subsequently mixed with the rubber base and the filler. The dynamic loss coefficient at 0° C. is an indicator of the grip performance (wet grip). The higher the dynamic loss coefficient at 0° C., the better the grip performance. On the other hand, the dynamic loss coefficient at 60° C. is an indicator of the rolling resistance. The lower the dynamic loss coefficient at 60° C., the better the rolling resistance. That is, when the modified polyisobutylene polymer for rubber compounding, according to one example of the present invention, is used to prepare rubber, there is an advantage in that the prepared rubber exhibits both the improved grip performance and the improved rolling resistance, which were difficult to achieve in the related art.

On the other hand, as described above, the modified polyisobutylene polymer for rubber compounding is prepared by reacting reactants including polyisobutylene whose main chain is isobutylene, unsaturated dicarboxylic anhydride, and an amino group-containing silane compound. Specifically, the modified polyisobutylene polymer is prepared by reacting an amino group-containing derivative with a derivative that is prepared by reacting polyisobutylene with an unsaturated dicarboxylic anhydride.

Specifically, the modified polyisobutylene polymer for rubber compounding may include an end group having a diamide structure satisfying Formula 2 shown below.

[Formula 2]

(In Formula 2, $L_1$ and $L_2$ are each independently a linear or branched (C1-C5)alkylene;

$R_1$ and $R_2$ are each independently selected from among (C1-C5)alkylene, (C1-C5)aminoalkylene, carbonylene, and (C1-C5)alkylcarbonylene;

$R_3$, $R_4$, and $R_5$ are each independently selected from among hydrogen, hydroxy, (C1-C20)alkyl, (C1-C12)cycloalkyl, (C2-C14)acyloxy, (C4-C20)aryloxy, (C5-C30) araloxy, (C1-C20)amine, and (C1-C12)alkoxy;

A is methylene, $S_n$, or $((R_6)NR_7)_n$ wherein $R_6$ is hydrogen or (C1-C5) alkyl, $R_7$ is (C1-C5)alkylene, and n is an integer in a range of from 1 to 10;

* indicates a connection with polyisobutylene.)

The diamide-type modified polyisobutylene polymer for rubber compounding includes a diamide structure including two amide groups. The dispersibility of the silica filler is improved and the physical properties of a rubber compound are improved through a reaction of a coupling agent, end-modified rubber, or a silica filler at an end of each amino group at which a silane element is present.

More specifically, the molar ratio of the components used is very important to prepare the modified polyisobutylene polymer for rubber compounding in the present invention. Specifically, the molar ratio of the polyisobutylene to the unsaturated dicarboxylic anhydride is 1:0.7 to 2, and the molar ratio of the derivative to the amino group-containing silane compound is 1:2 to 5. More preferably, the molar ratio of the polyisobutylene to the unsaturated dicarboxylic anhydride is 1:1 to 1.5, and the molar ratio of the derivative to the amino group-containing silane compound is 1:2.1 to 3. With such ranges satisfied, the content of the diamide-type modified polyisobutylene in the finally obtained modified polyisobutylene polymer may be 30 mol % or more, and preferably to 95 mol %. As such, the content of the diamide-type modified polyisobutylene in the finally obtained modified polyisobutylene polymer must be 30 mol % or more so that the storage modulus (ΔG') value of the rubber produced upon subsequent mixing with the rubber base and the filler can fall within a range of 2.5 or less and preferably a range of 2.0 or less. In addition, the dynamic loss factor at 0° C. can have a value of 0.64 or more and the dynamic loss factor at 60° C. can have a value of 0.112 or less. Preferably, the dynamic loss factor at 0° C. can have a value of 0.6422 or more and the dynamic loss factor at 60° C. can have a value of 0.1117 or less.

Figure 1:
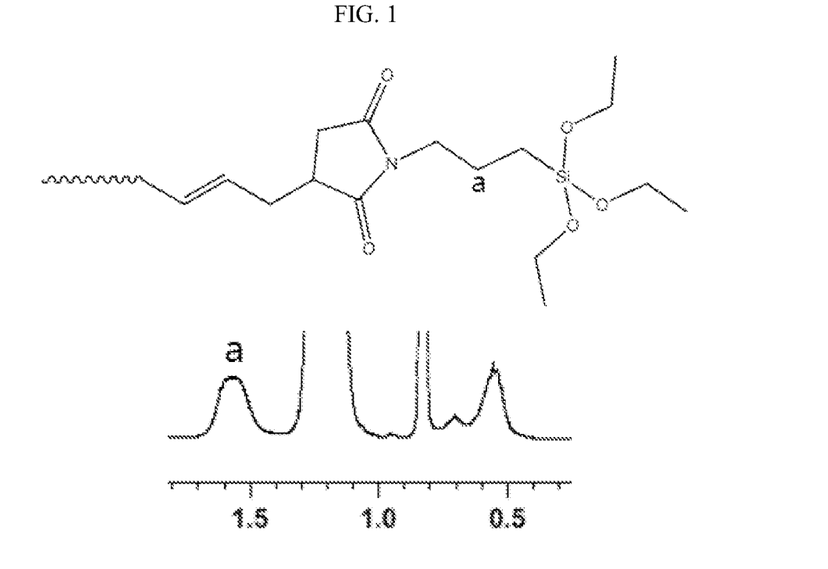
FIG. 1 is $^1$H NMR (solvent: Chloroform, $CDCl_3$) of a modified polyisobutylene polymer having an imide structure.
Figure 2:
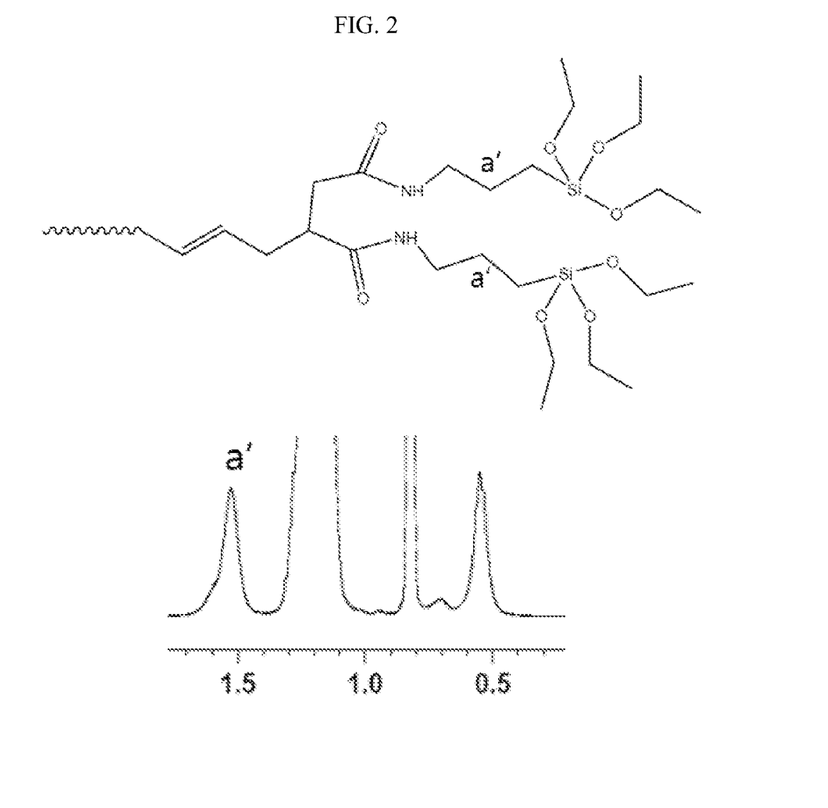
FIG. 2 is $^1$H NMR (solvent: Chloroform. $CDCl_3$) of a modified polyisobutylene polymer having a diamide structure.

In this case, the diamide structure and the content of the diamide-type modified polyisobutylene polymer can be confirmed through $^1$H NMR analysis shown in FIGS. 1 and 2, respectively.

FIG. 1 is $^1$H NMR of an imide-type modified polyisobutylene polymer prepared synthesized by a conventional method of reacting 3-aminopropyl triethoxysilane among amino group-containing silane compounds, and FIG. 2 is $^1$H NMR of a diamide-type polyisobutylene polymer synthesized using the same aminopropyl triethoxysilane.

In the imide-type modified polyisobutylene polymer of FIG. 1, it is characterized in that "a proton" appears at a chemically shifted position of 1.58 ppm. However, in the diamide-type polyisobutylene polymer of the present invention, since the succinic acid having a high electron density is ring-opened to form a diamide structure, shielding occurs to chemically shift the "a' proton". Thus, a peak appears at 1.52 ppm. As such, since the two modified polyisobutylene polymers differ in $^1$H NMR position between the "a proton" and the "a' proton", the fact that the diamide-type polyisobutylene polymer of the present invention is synthesized can be confirmed through $^1$H NMR analysis.

In addition, the ratio of the modified polyisobutylene polymer having a diamide structure can be calculated through Equation 1 using the ratio of the peak integral value $I_a$ of the "a proton" in $^1$H NMR and the peak integral value $I_{a'}$ of the "a' proton" in $^1$H NMR. For example, when the ratio of $I_a$:$I_{a'}$ is 1:2, the content of the modified polyisobutylene polymer having a diamide structure in the finally obtained modified polyisobutylene polymer is determined to be 50 mol %.

Proportion of diamide structure (mol %)=$\{0.5 \times I_{a'}/(I_a+0.5 \times I_{a'})\} \times 100$  [Equation 1]

On the other hand, in an example of the present invention, the polyisobutylene has a number average molecular weight in a range of from 200 g/mol to 10,000 g/mol, a molecular weight distribution in a range of from 1 to 5, and a terminal vinylidene content of 80 mol % or more based on $^{13}$C-NMR. More preferably, the number average molecular weight may be in a range of from 300 g/mol to 6,000 g/mol, the molecular weight distribution may be in a range of from 1 to 3, and the terminal vinylidene content may be in a range of from 85 to 95 mol % based on $^{13}$C-NMR. Particularly, there is an advantage that the reaction conversion rate and the active ingredient content in reactants can be increased with increase in the terminal vinylidene content of the polyisobutylene when preparing the modified polyisobutylene polymer. In addition, when the number average molecular weight of the polyisobutylene is less than 200 g/mol, a large amount of light polymer may be generated to be included in the modified polyisobutylene polymer prepared. On the other hand, when the number average molecular weight of the polyisobutylene is more than 10,000 g/mol, there is a problem in that the viscosity of the prepared modified polyisobutylene polymer is excessively high. When the molecular weight distribution falls within a range of 1 to 5, it is possible to prepare modified polyisobutylene polymers having a uniform molecular weight, thereby reducing variations in physical properties of the prepared modified polyisobutylene polymers.

In one example of the present invention, the unsaturated dicarboxylic anhydride may be at least one or a mixture of two or more ones selected from among maleic anhydride, itaconic anhydride, citraconic anhydride, propenyl succinic anhydride, and 2-pentendioic anhydride.

In one example of the present invention, the amino group-containing silane compound may be a compound satisfying Formula 1 shown below.

[Formula 1]

(In Formula 1, $R_1$ and $R_2$ are each independently selected from among (C1-C5)alkylene, (C1-C5)aminoalkylene, carbonylene, and (C1-C5)alkylcarbonylene;

$R_3$, $R_4$, and $R_5$ are each independently selected from among hydrogen, hydroxy, (C1-C20)alkyl, (C1-C12)cycloalkyl, (C2-C14)acyloxy, (C4-C20)aryloxy, (C5-C30) araloxy, (C1-C20)amine, and (C1-C12)alkoxy;

A is methylene, $S_n$, or $((R_6)NR_7)_n$ wherein $R_6$ is hydrogen or (C1-C5) alkyl, $R_7$ is (C1-C5)alkylene, and n is an integer in a range of from 1 to 10.)

More preferably, $R_1$ and $R_2$ are each independently a C1-C3 alkylene, $R_3$, $R_4$, and $R_5$ are each independently hydrogen, hydroxy, (C1-C5)alkyl, or (C1-C5)alkoxy;

A is methylene, $S_n$, or $((R_6)NR_7)_n$ wherein $R_6$ is hydrogen or (C1-C5) alkyl, $R_7$ is (C1-C5)alkylene, and n is an integer in a range of from 2 to 5.

When preparing a diamide-type modified polyisobutylene polymer by adding an amino group-containing silane compound satisfying the above range and subsequently preparing a rubber composition by mixing the modified polyisobutylene polymer with the rubber base and the filler, the dispersibility of the filler can be further improved.

In one example of the present invention, the amino group-containing silane compound may be one compound or a mixture of two or more compounds selected from the group consisting of 3-aminopropyl trimethoxysilane, 3-aminopropyl triethoxysilane, 3-aminopropyl methyldimethoxysilane, 3-aminopropyl methyldiethoxysilane, 3-(2-aminoethylamino)propyl trimethoxysilane, 3-(2-aminoethylamino)propyl triethoxysilane, N-(2-aminoethyl)-3-aminopropyl trimethoxysilane, N-(2 aminoethyl)-3-aminopropyl triethoxysilane, 3-aminopropyl silanetriol, (3-(2-aminoethylamino)propyl methyldimethoxysilane), 2-ethanediamine N-(2-aminoethyl)-N'-[3-(trimethoxysilyl)propyl]-1, 1-[3-(trimethoxysilyl)propyl]urea, 1-[3-(triethoxysilyl)propyl)]urea, etc.

Furthermore, the present invention provides a rubber composition including the diamide-type modified polyisobutylene polymer for rubber compounding, which is described above.

More specifically, the rubber composition according to the present invention includes the above-mentioned modified polyisobutylene polymer for rubber compounding; a rubber base; and a filler.

As described above, the rubber composition according to one example of the present invention has an advantage of exhibiting improved processability due to the presence of the above-mentioned diamide-type modified polyisobutylene polymer for rubber compounding, and an advantage of exhibiting both the grip performance and rolling resistance that are improved due to uniformly dispersed filler.

In the rubber composition according to one example of the present invention, the rubber base may include at least one selected from among butadiene rubber, butyl rubber, emulsion polymerization styrene butadiene rubber (E-SBR), solution polymerization styrene butadiene rubber (S-SBR), epichlorohydrin rubber, nitrile rubber, hydrogenated nitrile rubber, brominated polyisobutylisoprene-co-paramethyl styrene (BIMS) rubber, urethane rubber, fluororubber, silicone rubber, styrene-ethylenebutadiene styrene copolymer rubber, ethylenepropylene rubber, ethylenepropylenediene monomer rubber, hypalon rubber, chloroprene rubber, ethylene vinyl acetate rubber, and acrylic rubber. More preferably, the rubber base may include at least one selected from among butadiene rubber, styrene butadiene rubber (S-SBR), and butyl rubber.

More preferably, the rubber base may include styrene butadiene rubber, in which the styrene butadiene rubber has a styrene content of 9% to 19% and a vinyl group content of 10% to 54% in butadiene. Alternatively, the styrene butadiene rubber has a styrene content of 20% to 28% and a vinyl group content of 40% to 72% in butadiene. Further alternatively, the styrene butadiene rubber has a styrene content of 30% to 42% and a vinyl group content of 20% to 70% in butadiene.

In the rubber composition according to one example of the present invention, the filler may be used without limitation, so long as it is a filler typically used in a rubber composition. Preferably, a filler that is typically used in a rubber composition for tire treads is used, but the present invention is not limited thereto. In a specific and non-limited example, the filler may be silica, carbon black, or a mixture thereof.

Here, the silica may be used without limitation, so long as it is silica particles used in rubber, preferably rubber for tire treads. Specifically, the silica may have a specific surface area (CTAB) of 80 to 300 m$^2$/g, preferably 110 to 220 m$^2$/g, more preferably 150 to 180 m$^2$/g, and most preferably 165 m$^2$/g. When the specific surface area thereof is less than the above lower limit, reinforcing properties may decrease and thus the strength thereof may be lowered. On the other hand, when the specific surface area thereof exceeds the above upper limit, the viscosity may increase upon rubber compounding, and dispersion may also be impeded.

The carbon black also may be used without limitation, so long as it is carbon black typically used in rubber for tire treads, and carbon black having a grade of 500 to 600 is preferably used. Specific and non-limiting examples thereof may include commercially available carbon black such as N110, N121, N134, N220, N231, N234, N242, N293, N299, S315, N326, N330, N332, N339, N343, N347, N351, N358, N375, N539, N550, N582, N630, N642, N650, N660, N683, N754, N762, N765, N774, N787, N907, N908, N990, N991, etc., but the present invention is not limited thereto.

Moreover, the rubber composition according to one example of the present invention may further include a silane-coupling agent. Here, examples of the silane-coupling agent may include commercially available products such as Si-69 and the like, and known materials such as bis-(3-triethoxysilylpropyl)tetrasulfane (TESPT), bis-(3-ethoxysilylpropyl)disulfane (ESPD), N-[2-(vinylbenzylamino)-3-aminopropyltrimethoxysilane] and the like, but the present invention is not limited thereto.

The rubber composition according to one example of the present invention may include, relative to 100 parts by weight of the rubber base, 50 to 150 parts by weight of silica, 5 to 20 parts by weight of carbon black, 2 to 40 parts by weight of the modified polyisobutylene polymer for rubber compounding. Preferably, the rubber composition may include, relative to 100 parts by weight of the rubber base, 60 to 120 parts by weight of silica, 10 to 15 parts by weight of carbon black, and 5 to 15 parts by weight of the modified polyisobutylene polymer for rubber compounding.

When the silane coupling agent is further included in the rubber composition, the silane coupling agent may be added in an amount of 2 to 15 parts by weight and preferably 3 to 10 parts by weight, relative to 100 parts by weight of the rubber base.

In addition, the rubber composition according to one example of the present invention may further include an additive that is typically used in rubber compositions. As a specific and non-limiting example, the rubber composition may further include additives such as an antioxidant, an activator, a vulcanizing agent, a vulcanization accelerator, etc., and the amount of each of the additives may vary depending on the type of additive and the use of rubber being manufactured. As a specific and non-limiting example, relative to 100 parts by weight of the rubber base, 0.5 to 5 parts by weight of each additive may be added, but the present invention is not limited thereto.

As a specific and non-limiting example, the vulcanizing agent that is used may be sulfur, morpholine disulfide, or the like, and the vulcanization accelerator may include at least one selected from among sulfenamide-based, thiazole-based, thiuram-based, thiourea-based, guanidine-based, dithiocarbamic-acid-based, aldehyde-amine-based, aldehyde-ammonia-based, imidazoline-based, and xanthate-based vulcanization accelerators.

Specifically, the sulfenamide-based vulcanization accelerator may include at least one sulfenamide-based compound selected from among CBS (N-cyclohexyl-2-benzothiazylsulfenamide), TBBS (N-tert-butyl-2-benzothiazylsulfenamide), N,N-dicyclohexyl-2-benzothiazylsulfenamide, N-oxydiethylene-2- benzothiazylsulfenamide and N, N-diisopropyl-2-benzothiazolesulfenamide, the thiazole-based vulcanization accelerator may include at least one thiazole-based compound selected from among MBT (2-mercaptobenzothiazole), METS (dibenzothiazyl disulfide), 2-mercaptobenzothiazole sodium salt, zinc salt, copper salt, cyclohexylamine salt, 2-(2,4-dinitrophenyl)mercaptobenzothiazole and 2-(2,6-diethyl-4-morpholinothio)benzothiazole, the thiuram-based vulcanization accelerator may include at least one thiuram-based compound selected from among TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide and pentamethylenethiuram tetrasulfide, the thiourea-based vulcanization accelerator may include at least one thiourea-based compound selected from among thiocarbamide, diethylthiourea, dibutylthiourea, trimethylthiourea and di(ortho-tolyl)thiourea, and the guanidine-based vulcanization accelerator may include at least one guanidine-based compound selected from among diphenylguanidine, di(ortho-tolyl)guanidine, triphenylguanidine, ortho-tolyl biguanide and diphenylguanidine phthalate, but the present invention is not limited thereto.

The present invention provides a tire tread including the rubber composition described above. The tire tread according to the present invention has superior grip performance and rolling resistance as described above, and thus has an advantage of exhibiting excellent fuel efficiency compared to other tire treads under the same conditions. Specifically, the tire tread may be a tire tread used for a passenger car, an SUV, a bus, a truck, or an electric vehicle, but the present invention is not limited thereto.

A better understanding of the present invention will be given through examples and comparative examples described below. The examples described below are presented only to help understanding of the present invention, and the scope of the present invention is not limited thereto.

Preparation Example 1

<Preparation of Polyisobutylene Succinic Anhydride (PIBSA-1)>

Polyisobutylene (Mn: 300 g/mol, PD=1.2, α-vinylidene: 80.6 mol %, viscosity: 6 cSt at 40° C., 500 g, 1.67 mol) and maleic anhydride (172 g, 1.75 mol) were placed in a 1 L autoclave and allowed to react at 200° C. for 12 hours using a mechanical stirrer. To remove unreacted maleic anhydride, nitrogen bubbling was performed for 2 hours. Thus, polyisobutylene succinic anhydride [PIBSA-1] was obtained. The conversion rate thereof was determined to be 86.1% through column chromatography.

<Preparation of Modified Polyisobutylene Polymer in Diamide Form (MPIB-DA1)>

3-aminopropyl triethoxysilane (815.5 g, 3.69 mol) was put in a reactor under a Dean-Stark apparatus, the prepared PIBSA-1 (500 g, 1.23 mol) was diluted with 500 mL of toluene, and the diluted PiBSA-1 was added thereto at 120° C. Thereafter, a reaction was carried out at 120° C. for 4 hours. After the completion of the reaction, the unreacted compound and the solvent were removed to obtain 642 g of modified polyisobutylene. The results of measurement using $^1$H NMR showed that the diamide form in the polymerized modified polyisobutylene was about 88 mol %, the number average molecular weight was 912 g/mol, the weight average molecular weight was 1,632 g/mol, and the molecular weight distribution was 1.8. The Brookfield viscosity was 10 cP at 150° C., and XRF analysis showed that the Si content was measured to be 1.4% by mass.

Preparation Example 2

<Preparation of Polyisobutylene Succinic Anhydride (PIBSA-2)>

Polyisobutylene (Mn: 5,199 g/mol, PD=1.8, α-vinylidene: 87.0 mol %, viscosity: 11,322 cSt at 100° C., 500 g, 0.1 mol) and maleic anhydride (10.0 g, 0.1 mol) were placed in a 1 L autoclave and allowed to react at 230° C. for 12 hours using a mechanical stirrer. To remove unreacted maleic anhydride, nitrogen bubbling was performed for 2 hours. Thus, polyisobutylene succinic anhydride (PIBSA-2) was obtained. The conversion rate thereof was determined to be 70.4% through column chromatography.

<Preparation of Modified Polyisobutylene Polymer in Diamide Form (MPIB-DA2)>

3-aminopropyl triethoxysilane (40 g, 0.18 mol) was put in a reactor under a Dean-Stark apparatus, the prepared PIBSA-2 (300 g, 0.06 mol) was diluted with 500 mL of toluene, and the diluted PiBSA-2 was added thereto at 120° C. Thereafter, a reaction was carried out at 120° C. for 4 hours. After the completion of the reaction, the unreacted compound and the solvent were removed to obtain 362 g of modified polyisobutylene. The results of measurement using $^1$H NMR showed that the diamide form in the polymerized modified polyisobutylene was about 80 mol %, the number average molecular weight was 7,978 g/mol, the weight average molecular weight was 32,510 g/mol, and the molecular weight distribution was 4.1. The Brookfield viscosity was 9,200 cP at 150° C., and XRF analysis showed that the Si content was measured to be 0.05% by mass.

Preparation Example 3

<Preparation of Polyisobutylene Succinic Anhydride (PIBSA-3)>

Polyisobutylene (product name: DAELIM-HRPB1000, Mn: 992 g/mol, PD=1.4, α-vinylidene: 88.3 mol %, viscosity: 193 cSt at 100° C., 500 g, 0.5 mol) and maleic anhydride (52 g, 0.5 mol) were placed in a 1 L autoclave and allowed to react at 230° C. for 12 hours using a mechanical stirrer. To remove unreacted maleic anhydride, nitrogen bubbling was performed for 2 hours. Thus, polyisobutylene succinic anhydride PIBSA-3 was obtained. The conversion rate thereof was determined to be 78.4% through column chromatography.

<Preparation of Modified Polyisobutylene Polymer in Diamide Form (MPIB-DA3)>

3-aminopropyl triethoxysilane (139 g, 0.63 mol) was put in a reactor under a Dean-Stark apparatus, the prepared PIBSA-3 (300 g, 0.21 mol) was diluted with 500 mL of toluene, and the diluted PiBSA-2 was added thereto at 120° C. Thereafter, a reaction was carried out at 120° C. for 4 hours. After the completion of the reaction, the unreacted compound and the solvent were removed to obtain 372 g of modified polyisobutylene. The results of measurement using $^1$H NMR showed that the diamide form in the polymerized modified polyisobutylene was about 85 mol %, the number average molecular weight was 1,112 g/mol, the weight average molecular weight was 2,190 g/mol, and the molecular weight distribution was 2.0. The Brookfield viscosity was 250 cP at 150° C., and XRF analysis showed that the Si content was 1.6% by mass.

Preparation Example 4

<Preparation of Modified Polyisobutylene Polymer in Diamide Form (MPIB-DA4)>

3-aminopropyl triethoxysilane (121 g, 0.55 mol) was put in a reactor under a Dean-Stark apparatus, the prepared PIBSA-3 (300 g, 0.21 mol) was diluted with 500 mL of toluene, and the diluted PiBSA-2 was added thereto at 120° C. Thereafter, a reaction was carried out at 120° C. for 4 hours. After the completion of the reaction, the unreacted compound and the solvent were removed to obtain 365 g of modified polyisobutylene. The results of measurement using $^1$H NMR showed that the diamide form in the polymerized modified polyisobutylene was about 61 mol %, the number average molecular weight was 1,201 g/mol, the weight average molecular weight was 3,280 g/mol, and the molecular weight distribution was 2.7. The Brookfield viscosity was 320 cP at 150° C., and XRF analysis showed that the Si content was 1.7% by mass.

Preparation Example 5

<Preparation of Modified Polyisobutylene Polymer in Diamide Form (MPIB-DA5)>

3-aminopropyl triethoxysilane (102 g, 0.46 mol) was put in a reactor under a Dean-Stark apparatus, the prepared PIBSA-3 (300 g, 0.21 mol) was diluted with 500 mL of toluene, and the diluted PiBSA-2 was added thereto at 120° C. Thereafter, a reaction was carried out at 120° C. for 4 hours. After the completion of the reaction, the unreacted compound and the solvent were removed to obtain 360 g of modified polyisobutylene. The results of measurement using $^1$H NMR showed that the diamide form in the polymerized modified polyisobutylene was about 38 mol %, the number average molecular weight was 1,530 g/mol, the weight average molecular weight was 4,120 g/mol, and the molecular weight distribution was 3.6. The Brookfield viscosity was 380 cP at 150° C., and XRF analysis showed that the Si content was 1.6% by mass.

Preparation Example 6

<Preparation of Modified Polyisobutylene Polymer in Diamide Form (MPIB-DA6)>

Under a Dean-Stark apparatus, the prepared PIBSA-3 (300 g, 0.21 mol) was diluted in 500 mL of toluene and then the diluted PIBSA-3 was put into a reactor. Next, 3-aminopropyl triethoxysilane (60.3 g, 0.27 mol) was diluted with 60 ml of toluene, and the diluted 3-aminopropyl triethoxysilane was put into the reactor at room temperature of 25° C. to 30° C. Next, zinc chloride (12.3 g, 0.09 mol) was put into the reactor. After the temperature of the reactor was raised to 80° C., hexamethyldisilazane (14.7 g, 0.09 mol) was diluted with 50 ml of toluene, and the diluted hexamethyldisilazane was slowly introduced into the reactor. Thereafter, a reaction was carried out at 80° C. for 4 hours. After completion of the reaction, the resulting product was filtered using a filter having a pore size of 0.5 μm or less, and then unreacted compounds and solvents were removed to obtain 336 g of modified polyisobutylene. The results of measurement using $^1$H NMR showed that the diamide form in the polymerized modified polyisobutylene was about 20 mol %, the number average molecular weight was 1,936 g/mol, the weight average molecular weight was 7,602 g/mol, and the molecular weight distribution was 3.9. The Brookfield viscosity was 420 cP at 150° C., and XRF analysis showed that the Si content was 1.4% by mass.

Preparation Example 7

<Preparation of Modified Polyisobutylene Polymer in Imide Form (MPIB-Imide)>

Under a Dean-Stark apparatus, the prepared PIBSA-3 (300 g, 0.21 mol) was diluted with 500 mL of toluene and then the diluted PIBSA-3 was put into a reactor. Next, 3-aminopropyl triethoxysilane (60.3 g, 0.27 mol) was diluted with 60 ml of toluene, and the diluted 3-aminopropyl triethoxysilane was put into the reactor at room temperature of 25° C. to 30° C. Next, zinc chloride (37 g, 0.27 mol) was put into the reactor. After the temperature of the reactor was raised to 80° C., hexamethyldisilazane (44.02 g, 0.27 mol) was diluted with 50 ml of toluene, and the diluted hexamethyldisilazane was slowly introduced into the reactor. Thereafter, a reaction was carried out at 80° C. for 4 hours. After completion of the reaction, the resulting product was filtered using a filter having a pore size of 0.5 μm or less, and then unreacted compounds and solvents were removed to obtain 340 g of modified polyisobutylene. The polymerized modified polyisobutylene was confirmed to have a number average molecular weight of 1,362 g/mol, a weight average molecular weight of 2,039 g/mol, and a molecular weight distribution of 1.5. The Brookfield viscosity was 230 cP at 150° C., and XRF analysis showed that the Si content was 1.8% by mass.

The physical properties of the modified polyisobutylene polymers prepared, respectively, in Preparation Examples 1 to 7 are shown in Table 1 below.

TABLE 1

|  | Mn (g/mol) | Molecular weight distribution | Polymer in diamide form (mol %) | Viscosity (cP) | Si content (mass %) |
|---|---|---|---|---|---|
| Preparation Example 1 | 912 | 1.8 | 88 | 10 | 1.4 |
| Preparation Example 2 | 7978 | 4.1 | 80 | 9200 | 0.05 |
| Preparation Example 3 | 1112 | 2.0 | 85 | 250 | 1.6 |
| Preparation Example 4 | 1201 | 2.7 | 61 | 320 | 1.7 |
| Preparation Example 5 | 1530 | 3.6 | 38 | 380 | 1.6 |
| Preparation Example 6 | 1936 | 3.9 | 20 | 420 | 1.4 |
| Preparation Example 7 | 1362 | 1.5 | 0 | 230 | 1.8 |

Preparation of Rubber Composition (Examples 1 to 5 and Comparative Examples 1 to 4)

Example 1

A rubber base was prepared by mixing 82.5 parts by weight of styrene-butadiene rubber 1 (styrene 33%, vinyl 48%, TDAE 37.5 phr, SBR1) and 40.0 parts by weight of styrene-butadiene rubber 2 (styrene 15%, vinyl 30% (in butadiene), SBR2). Relative to 100 parts by weight of this rubber base, 10 parts by weight of carbon black, 80 parts by weight of silica (US7000GR, Evonik, CTAB 165 m2/g), 13.5 parts by weight of rubber compound (treated distillate aromatic extracted (TDAE)) oil, 6.4 parts by weight of SI-69 which is a silica coupling agent, 3.0 parts by weight of zinc oxide, 2.0 parts by weight of stearic acid, 1.6 parts by weight of sulfur (Miwon Chemical) as a vulcanizing agent, 1.6 parts by weight of N-cyclohexyl-2-benzothiazylsulfenamide (CBS) as a vulcanization accelerator, 2.0 parts by weight of 1,3-diphenylguanidine (DPG), and 10.0 parts by weight of the modified polyisobutylene polymer (MPIB-DA1) of Preparation Example 1 were mixed in a sealed Banbari mixer to prepare a master batch. Next, mixed rubber was prepared in an open twin-screw roll mill and vulcanized at 165° C. for 10 minutes to prepare rubber. The composition of the rubber composition is shown in Table 2.

Example 2

The same procedure as in Example 1 was performed, except that the MPIB-DA2 of Preparation Example 2 was used instead of the MPIB-DA1 of Preparation Example 1.

Example 3

The same procedure as in Example 1 was performed, except that the MPIB-DA3 of Preparation Example 3 was used instead of the MPIB-DA1 of Preparation Example 1.

Example 4

The same procedure as in Example 1 was performed, except that the MPIB-DA4 of Preparation Example 4 was used instead of the MPIB-DA1 of Preparation Example 1.

Example 5

The same procedure as in Example 1 was performed, except that the MPIB-DA5 of Preparation Example 5 was used instead of the MPIB-DA1 of Preparation Example 1.

Comparative Example 1

A rubber composition was prepared in the same manner as in Example 1, except that the MPIB-DA1 of Preparation Example 1 was not added when preparing the rubber composition, and 23.5 parts by weight of the TDAE oil was mixed to prepare a rubber.

Comparative Example 2

A rubber composition was prepared in the same manner as in Example 1, except that the MPIB-DA1 of Preparation Example 1 was not added when preparing the rubber composition, and 10 parts by weight of Terpene phenol resin (Yashuhara Chemical T160) was mixed to prepare a rubber.

Comparative Example 3

The same procedure as in Example 1 was performed, except that the MPIB-DA6 of Preparation Example 6 was used instead of the MPIB-DA1 of Preparation Example 1.

Comparative Example 4

The same procedure as in Example 1 was performed, except that the MPIB-Imide of Preparation Example 7 was used instead of the MPIB-DA1 of Preparation Example 1.

The specific composition of the rubber composition is shown in Tables 2 and 3 below.

TABLE 2

| Classification (phr) | | Example 1 | Example 2 | Example 3 | Example 4 | Example 5 |
|---|---|---|---|---|---|---|
| Polymer | SBR1 | 82.5 | same as the left | | | |
| | SBR2 | 40.0 | | | | |
| Filler | Silica | 80 | | | | |
| | Carbon black | 10 | | | | |
| | Si-69 | 6.4 | | | | |
| Oil & Chemical | TDAE oil | 13.5 | 13.5 | 13.5 | 13.5 | 13.5 |
| | Preparation Example 1 | 10 | — | — | — | — |
| | Preparation Example 2 | — | 10 | — | — | — |
| | Preparation Example 3 | — | — | 10 | — | — |
| | Preparation Example 4 | — | — | — | 10 | — |
| | Preparation Example 5 | — | — | — | — | 10 |
| | Zinc oxide | 3 | same as the left | | | |
| | Stearic acid | 2 | | | | |
| Final MB | Sulfur | 1.6 | | | | |
| | CBS | 1.6 | | | | |
| | DPG | 2.0 | | | | |

TABLE 3

| Classification (phr) | | Comparative Example 1 | Comparative Example 2 | Comparative Example 3 | Comparative Example 4 |
|---|---|---|---|---|---|
| Polymer | SBR1 | 82.5 | same as the left | | |
| | SBR2 | 40.0 | | | |
| Filler | Silica | 80 | | | |
| | Carbon black | 10 | | | |
| | Si-69 | 6.4 | | | |
| Oil & Chemical | TDAE oil | 23.5 | 13.5 | 13.5 | 13.5 |
| | Terpene resin | — | 10 | — | — |
| | Preparation Example 6 | — | — | 10 | — |
| | Preparation Example 7 | — | — | — | 10 |
| | Zinc oxide | 3 | same as the left | | |
| | Stearic acid | 2 | | | |
| Final MB | Sulfur | 1.6 | | | |
| | CBS | 1.6 | | | |
| | DPG | 2.0 | | | |

The properties of each of the prepared rubber compositions were measured through the methods described below. Considering that some properties of the rubber composition vary depending on the surrounding environmental conditions, results obtained under the same conditions on the same day are shown in Table 4.

Evaluation of Payne Effect

The Payne effect is associated with storage modulus values measured at elongations of 0.02% and 20%, and the smaller the change, the better the dispersion of silica, whereby superior rolling resistance can be obtained and thus the general properties of the rubber can be improved. For the rubbers manufactured in Examples and Comparative Examples, the Payne effect value was measured in a 0.02-20% strain sweep at a rate of 1 Hz at 60° C. using a sample having a weight of 7 g or more and an RPA 2000 from ALPHA Technologies Ltd., and the difference ($\Delta' = G'_{20\%} - G'_{0.02\%}$) between the storage modulus values measured at elongations of 0.02% and 20% was determined, and the results thereof are shown in Table 4 below.

Measurement of Grip Performance and Rolling Resistance Through Dynamic Loss Coefficient A Tan δ value at 0° C. corresponds to the gripping force, and the higher the value, the better the gripping force. On the other hand, the Tan δ value at 60° C. corresponds to the rotational resistance, and the smaller this value, the better the rotational resistance [M. J. Wang, Rubber. Chem. Technol., 71, 520 (1998)]. Using dynamic mechanical thermal spectrometry (DTMS: GABO, EPLEXOR 500N) for the rubbers prepared in Examples and Comparative Examples, the dynamic loss coefficients and glass transition temperatures (Tg) at 0° C. and 60° C. were measured. The results are shown in Table 4. Here, the measurement conditions were as follows: frequency: 10 Hz, strain (static strain: 3%, dynamic strain: 0.25%), and temperature: −60° C. to 70° C.

TABLE 4

| Classification | | Comp. Exam. 1 | Comp. Exam. 2 | Comp. Exam. 3 | Comp. Exam. 4 | Example 1 | Example 2 | Example 3 | Example 4 | Example 5 |
|---|---|---|---|---|---|---|---|---|---|---|
| Payne Effect | ΔG' No vulcanization | 2.8 | 2.6 | 2.1 | 2.1 | 1.7 | 1.8 | 2.0 | 1.8 | 2.0 |
| DMA | Tg | −10.4 | −5.8 | −9.1 | −9.2 | −8.9 | −8.3 | −8.9 | −9.4 | −9.5 |
| | Tanδ at 0° C. | 0.5550 | 0.6798 | 0.6207 | 0.5952 | 0.6467 | 0.6721 | 0.6422 | 0.6565 | 0.6517 |
| | Tanδ at 60° C. | 0.1166 | 0.1303 | 0.1109 | 0.1119 | 0.1114 | 0.1104 | 0.1117 | 0.1096 | 0.1108 |

Referring to Table 4, Examples 1 to 5 exhibited ΔG' values that were as low as 2.0 or less, but Comparative Examples 1 to 4 exhibited ΔG' values that were 2.1 or more. Thus, it was found that, when any one of the modified polyisobutylene polymers respectively prepared according to Preparation Examples 1 to 5 in which the diamide form was present in an amount 30 mol % or more is included in the rubber composition, fillers such as carbon black and silica were uniformly well dispersed in the rubber composition.

In addition, in the case of Examples 1 to 5, the Tan δ at 0° C., which represents more excellent grip performance as the value thereof increases, was measured to be as high as 0.64 or higher, and the Tan δ at 60° C., which represents more excellent rotational resistance as the value thereof increases, was measured to be as low as 0.112 or less. That is, the rubber compositions of Examples 1 to 5 were confirmed to be improved in both the grip performance and the rotational resistance as compared to Comparative Example 1.

On the other hand, in the case of Comparative Example 1 in which TDAE, which is a rubber compound oil, was added, the Tan δ at 0° C. was significantly lowered to 0.5550, confirming that braking performance was significantly reduced.

In the case of Comparative Example 2, since Terpene resin, which is a traction improving additive, was added, the value of the Tan δ value at 0° C. was as high as 0.67 or more and the value of the Tan δ at 60° C. was as high as 0.13 or more. That is, the rubber of Comparative Example 2 was confirmed to be poor rolling resistance. That is, the effect of improving fuel economy was confirmed to be deteriorated.

On the other hand, in Comparative Examples 3 and 4 in which the modified polyisobutylene polymers of Preparation Examples 6 or 7, in each of which the imide form was dominant to account for over 70 mol %, were added to the respective rubber compositions, the braking performance and the fuel economy were improved compared to Comparative Example 1, but the degree of improvement is not significant.

What is claimed is:

1. A modified polyisobutylene polymer for rubber compounding comprising a diamide structure satisfying Formula 2 below

[Formula 2]

wherein in Formula 2, $L_1$ and $L_2$ are each independently a linear or branched (C1-C5)alkylene;

$R_1$ and $R_2$ are each independently selected from among (C1-C5)alkylene, (C1-C5)aminoalkylene, carbonylene, and (C1-C5)alkylcarbonylene;

$R_3$, $R_4$, and $R_5$ are each independently selected from among hydrogen, hydroxy, (C1-C20)alkyl, (C1-C12) cycloalkyl, (C2-C14)acyloxy, (C4-C20)aryloxy, (C5-C30) araloxy, (C1-C20)amine, and (C1-C12)alkoxy;

A is methylene, $S_n$, or $((R_6)NR_7)_n$ wherein $R_6$ is hydrogen or (C1-C5) alkyl, $R_7$ is (C1-C5)alkylene, and n is an integer in a range of from 1 to 10;

* indicates a connection with polyisobutylene.

2. The modified polyisobutylene polymer according to claim 1, wherein a result of X-ray fluorescence analysis shows that the modified polyisobutylene polymer has a Si content in a range of from 0.03 mass % to 10 mass %.

3. The modified polyisobutylene polymer according to claim 1, wherein the modified polyisobutylene polymer has a viscosity in a range of from 1 to 15,000 cP at 150° C.

4. The modified polyisobutylene polymer according to claim 1, wherein the modified polyisobutylene polymer has a number average molecular weight in a range of from 800 to 10,000 g/mol.

5. The modified polyisobutylene polymer according to claim 1, wherein the modified polyisobutylene polymer has a molecular weight distribution in a range of from 1 to 5.

6. A rubber composition comprising: the modified polyisobutylene polymer according to claim 1; a rubber base; and a filler.

7. The rubber composition according to claim 6, wherein the filler is silica, carbon black, or a mixture thereof.

8. The rubber composition according to claim 6, wherein the rubber base comprises at least one selected from among butadiene rubber, butyl rubber, emulsion polymerization styrene butadiene rubber (E-SBR), solution polymerization styrene butadiene rubber (S-SBR), epichlorohydrin rubber, nitrile rubber, hydrogenated nitrile rubber, brominated polyisobutylisoprene-co-paramethyl styrene (BIMS) rubber, urethane rubber, fluoro rubber, silicone rubber, styrene-ethylenebutadiene styrene copolymer rubber, ethylenepropylene rubber, ethylenepropylenediene monomer rubber, hypalon rubber, chloroprene rubber, ethylene vinyl acetate rubber, and acrylic rubber.

9. The rubber composition according to claim 6, wherein the rubber composition comprises 50 to 150 parts by weight of silica, 5 to 20 parts by weight of carbon black, and 2 to 40 parts by weight of the modified polyisobutylene polymer, relative to 100 parts by weight of the rubber base.

* * * * *